United States Patent
Astafieva et al.

(10) Patent No.: US 9,594,171 B2
(45) Date of Patent: Mar. 14, 2017

(54) DETECTOR FOR RADIATION, PARTICULARLY HIGH ENERGY ELECTROMAGNETIC RADIATION

(75) Inventors: Irina Astafieva, Moscow (RU); Oliver Heid, Erlangen (DE); Timothy Hughes, Erlangen (DE)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

(21) Appl. No.: 14/403,707

(22) PCT Filed: Jun. 8, 2012

(86) PCT No.: PCT/RU2012/000450
§ 371 (c)(1),
(2), (4) Date: Feb. 12, 2015

(87) PCT Pub. No.: WO2013/184020
PCT Pub. Date: Dec. 12, 2013

(65) Prior Publication Data
US 2015/0338527 A1 Nov. 26, 2015

(51) Int. Cl.
*G01V 5/04* (2006.01)
*G01T 1/185* (2006.01)
(Continued)

(52) U.S. Cl.
CPC ............ *G01T 1/185* (2013.01); *G01T 1/2006* (2013.01); *H01J 47/02* (2013.01); *H01J 47/024* (2013.01)

(58) Field of Classification Search
CPC . G01V 5/06; G01V 5/04; G01V 5/101; G01N 33/2823; G01T 1/2006; G01T 1/2008; G01T 1/24; G01T 1/241
See application file for complete search history.

(56) References Cited

U.S. PATENT DOCUMENTS 5,742,061 A 4/1998 Bartol
6,011,265 A 1/2000 Sauli
(Continued)

FOREIGN PATENT DOCUMENTS

JP 9-508750 9/1997
JP 2001508935 A 7/2001
(Continued)

OTHER PUBLICATIONS

Translation of Chinese Office Office Action for application No. 201280073807.7, mailed on Dec. 28, 2015.
(Continued)

*Primary Examiner* — David Porta
*Assistant Examiner* — Mamadou Faye
(74) *Attorney, Agent, or Firm* — Schmeiser Olsen & Watts LLP

(57) ABSTRACT

A detector for radiation, particularly high energy electromagnetic radiation is provided. The detector includes a converting section including a cathode for converting the radiation incident on the converting section in electrons by the photoelectric effect. The detector further includes a gas electron multiplier for generating an electron avalanche from electrons which are generated by the converting section and enter the gas electron multiplier, the gas electron multiplier including a first electrode, a dielectric layer and a second electrode, the first electrode being disposed at a first side of the dielectric layer adjacent to the converting section and the second electrode being disposed at a second side of the dielectric layer opposite to the first side. The gas electron multiplier includes a number of holes filled with gas, the holes extending through the first electrode, the dielectric layer and the second electrode.

14 Claims, 3 Drawing Sheets

(51) Int. Cl.
*H01J 47/02* (2006.01)
*G01T 1/20* (2006.01)

(56) References Cited

U.S. PATENT DOCUMENTS

| | | | |
|---|---|---|---|
| 6,414,317 B1* | 7/2002 | Francke | H01J 47/04 250/374 |
| 6,477,223 B1 | 11/2002 | Francke | |
| 2003/0052276 A1* | 3/2003 | Francke | G01T 1/185 250/385.1 |
| 2004/0258206 A1 | 12/2004 | Maolinbay et al. | |
| 2008/0283725 A1* | 11/2008 | Hahn | H01J 47/02 250/207 |
| 2010/0072893 A1* | 3/2010 | Eden | H01J 9/241 313/582 |
| 2011/0147600 A1* | 6/2011 | Spahn | G01T 1/2935 250/370.09 |
| 2012/0018642 A1 | 1/2012 | Fukuda et al. | |

FOREIGN PATENT DOCUMENTS

| | | |
|---|---|---|
| JP | 2002541490 A | 12/2002 |
| JP | 2005010163 A | 1/2005 |
| JP | 2009206057 A | 9/2009 |
| RU | 2291469 C1 | 1/2007 |
| WO | WO 9921211 A1 | 4/1999 |
| WO | WO 0062097 A1 | 10/2000 |
| WO | WO 2013184020 A1 | 12/2013 |

OTHER PUBLICATIONS

Translation of Japanese Office Action for Application No. 2015-515980, dated Dec. 9, 2015.
Translation of Russian Office Action for Application No. 2014152033, mailed on Mar. 30, 2016.
International Search Report for PCT/RU2012/000450, mailed on Apr. 19, 2013.

* cited by examiner

DETECTOR FOR RADIATION, PARTICULARLY HIGH ENERGY ELECTROMAGNETIC RADIATION

CROSS-REFERENCE TO RELATED APPLICATIONS

This application claims priority to PCT Application No. PCT/RU2012/000450, having a filing date of Jun. 8, 2012, the entire contents of which are hereby incorporated by reference.

FIELD OF TECHNOLOGY

The following relates to a detector for radiation, particularly high energy electro-magnetic radiation.

BACKGROUND

For the detection of radiation, many different types of detectors are known from the prior art. For sensing high energy electromagnetic radiation, scintillation detectors comprising a scintillator crystal and a photomultiplier tube are widely used in different technical fields, e.g. in medical imaging equipment or for well-logging in the oil and gas industry. In a scintillation detector, the radiation falls on a scintillator crystal converting the radiation in light impinging on a photocathode. This photocathode is part of a photomultiplier tube comprising a plurality of dynodes in a glass envelope. Due to the photoelectric effect, the light falling on the photocathode causes the emission of primary electrons inside the photomultiplier tube. The electrons are accelerated towards the dynodes in the tube resulting in secondary electron cascades which are detected as an output signal. Scintillation detectors are relatively bulky due to the photomultiplier tube which has a length of several centimeters. Furthermore, the spatial resolution of those detectors is relatively low.

Another type of detector known from the prior art refers to so-called gas electron multipliers where electrons generated by the photoelectric effect enter corresponding holes filled with gas. There is a high electric field within the holes accelerating the electrons entering the holes resulting in secondary electrons due to the hits of the electrons with gas atoms/molecules. Thus, an electron avalanche is generated.

A radiation detector including a gas electron multiplier is disclosed in U.S. Pat. No. 6,011,265. In this detector, a detector anode arranged in a distance from the gas electron multiplier is used for detecting the electron avalanche. The gas electron multiplier comprises an insulating material with corresponding holes therein and two electrodes disposed on the insulating material which generate a high electric field inside the holes. The detector has the disadvantage that not all electrons of the electron avalanche can be detected by the detector anode because some electrons are discharged on the electrode of the gas electron multiplier adjacent to the detector anode.

SUMMARY

An aspect relates to providing a detector for radiation of compact size which provides precise measurements.

Embodiments of the detector are designed for detecting radiation and particularly high energy electromagnetic radiation. Here and in the following, high energy electromagnetic radiation refers to radiation starting from 10 keV up to 100 MeV and more, particularly to X-ray radiation and/or Gamma radiation.

Embodiments of the detector comprise a converting section including a cathode. This section converts the radiation to be detected and incident on the converting section in electrons by the photoelectric effect. Furthermore, the detector includes a gas electron multiplier for generating an electron avalanche from electrons which are generated in the converting section and enter the gas electron multiplier. The gas electron multiplier includes a first electrode, a dielectric layer and a second electrode. The first electrode and the second electrode are preferably made of copper. Furthermore, the dielectric material is preferably made of Kapton. The first electrode is disposed at a first side of the dielectric layer adjacent to the converting section and the second electrode is disposed at a second side of the dielectric layer which is opposite to the first side. The gas electron multiplier comprises a number of holes and particularly a plurality of holes filled with gas (e.g. neon) where said holes extend through the first electrode, the dielectric layer and the second electrode. The detector further comprises a detector anode adjacent to the second electrode for detecting the electron avalanche.

Embodiments of the detector anode extends at each hole from the second electrode over the hole such that the hole is covered at one side completely by the detector anode. Based on the realization that by covering the holes of a gas electron multiplier by the detector anode, no electrons of the electron avalanche are lost due to discharge at the second electrode. Hence, a more precise measurement of the radiation can be achieved by this detector. Furthermore, embodiments of the detector have a much more compact size in comparison to scintillation detectors with photomultiplier tubes because the thickness of gas electron multipliers usually lies in the range of several microns compared to several centimeters for a photomultiplier. Moreover, the spatial resolution of a gas electron multiplier can be made much higher in comparison to scintillation detectors including photomultiplier tubes.

In a preferred embodiment of the detector, the converting section comprises a photocathode and a scintillator material, e.g. NaI(Tl), disposed at the side of the photocathode facing the radiation entering the converting section. The scintillator material converts the incident radiation in light. The photons of this light cause electrons to be emitted directly from the photocathode due to the photoelectric effect. As a consequence, the photocathode can be arranged near the holes of the gas electron multiplier reducing the size of the detector. However, in another embodiment, the converting section may also comprise a conventional cathode and a gas volume such that the radiation goes through the cathode and causes the emission of electrons from the gas atoms/molecules in the gas volume due to the photoelectric effect.

The photocathode of the above described embodiment may be disposed directly on (i.e. in contact with) the first electrode. However, also a gap filled with gas may be present between the photocathode and the first electrode.

In a particularly preferred embodiment of the invention, the detector anode and the second electrode form an integral electrode leading to a simple design of the detector.

In another embodiment of the invention, the detector anode extends at one or more holes and particularly at each hole in or parallel to the plane of the second electrode.

In another embodiment, the detector anode has at one or more holes and particularly at each hole a U-shaped cross-section along a plane perpendicular to the second electrode.

Furthermore, the detector anode may have at one or more holes and particularly at each hole a half-elliptic cross-section. Due to the use of a U-shaped or half-elliptic cross-section, the detector surface of the anode is increased.

The holes in the gas electron multiplier may have different forms. In one embodiment, at least one hole and particularly each hole has a cylindrical form. In another embodiment, at least one hole and particularly each hole is tapered conically from the first electrode towards the second electrode. Furthermore, at least one hole and particularly each hole may be tapered conically from both the first electrode and the second electrode to the interior of the hole.

In order to achieve a high spatial resolution, the maximum diameter of each hole lies between 10 and 100 μm and/or the distance between the centers of adjacent holes in the plane view of the first electrode lies between 10 and 100 μm.

The detector according to embodiments of the invention may be used in different fields of technology. In a preferred embodiment, the detector is a detector for detecting radiation in a medical device, particularly a computer tomograph. In other words, embodiments of the invention also refer to a computer tomograph comprising a detector. Furthermore, the detector of embodiments of the invention may be used in a well-logging device used to record the geologic formation penetrated by a borehole. Hence, the invention also refers to a well-logging device including the above described detector. The invention may also be used in other than the above technical fields. E.g., the detector of the invention may be used in nuclear physics for studying radioactive nuclides spectra, for measurement of times of life for nuclear kernels, in geology (activation analysis, mineral searching, definition of rocks age), biology, defectoscopy and the like.

BRIEF DESCRIPTION

Some of the embodiments will be described in detail, with reference to the following figures, wherein the designations denote like members, wherein.

DETAILED DESCRIPTION

In the following, embodiments of the invention will be described with respect to a scintillation detector including a plurality of cells for detecting high-energy electromagnetic radiation and particularly X-Ray radiation and/or Gamma radiation.

Figure 1:
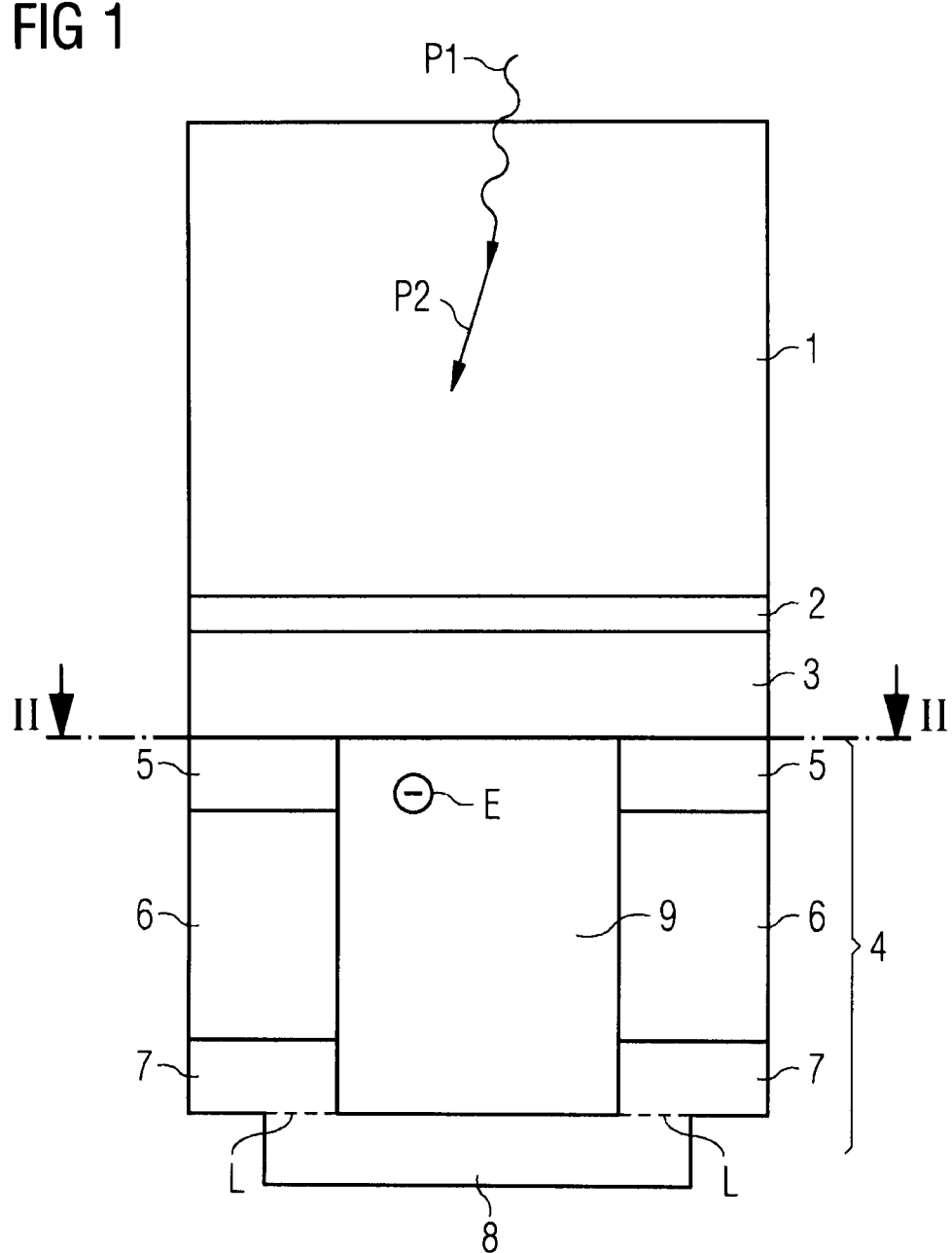
FIG. 1 shows a sectional view of an embodiment of one cell of a detector for high-energy.

FIG. 1 shows a sectional view of one cell of a detector according to a first embodiment of the invention. The detector includes a scintillation material 1 which converts the high energy radiation to be detected (indicated by arrow P1) in light (indicated by arrow P2), i.e. in an electromagnetic radiation with another wavelength than the incident radiation. Depending on the scintillator material, the light produced in the material may lie within the visible spectrum or in a spectrum adjacent to the visible spectrum. In a preferred embodiment, NaI(Tl) (Sodium Iodide activated with Thallium) is used as a scintillator crystal. An optical transmissive window 2 (preferably made of an appropriate glass) is disposed at the bottom of this scintillator crystal.

The light produced in the scintillator crystal reaches through the optical window 2 a photocathode 3 with the consequence that, due to the photoelectric effect, electrons E are emitted from the photocathode. The upper part of the detector comprising the scintillator 1, the optical window 2 and the photocathode 3 represent an embodiment of a converting section as defined in claim 1. In another embodiment, this converting section may be structured differently, e.g. by a cathode and a gap filled with gas such that the photoelectric effect is based on the interaction between radiation passing through the cathode and the gas electrons in the gas volume.

Under the converting section of FIG. 1, there is disposed a gas electron multiplier 4. This multiplier includes a first electrode 5 (preferably made of copper), a dielectric material 6 (preferably made of Kapton) and a second electrode 7 (preferably made of copper). A cylindrical hole 9 is formed through the electrodes 5 and 7 and the dielectric material 6. The hole is filled with a gas, e.g. neon. An appropriate voltage (e.g. 100 V) is applied between the first and second electrodes so that a region of a large electric field exists within the hole 9. Hence, an electron E entering hole 9 is accelerated and hits the gas atoms/molecules producing secondary electrons which once again hit other atoms and so on. As a consequence, an electron avalanche is produced. This avalanche is detected by the detector anode 8 disposed at the bottom of the hole 9. An appropriate electric potential exists between this anode and the cathode 3. Contrary to the prior art, the detector anode 8 is not spaced apart from the second electrode 7. Instead, the electrode 7 and the detector anode 8 form an integral electrode. This has the advantage that all avalanche electrons generated in the hole 9 are detected by the detector anode 8.

Contrary to that, in a prior art detector, the dashed lines L shown in FIG. 1 form the bottom side of the electrode 7 where the detector anode 8 is spaced apart from the electrode 7. As a consequence, not all avalanche electrons reach the detector anode 8 because some electrons at the edge of the hole will impinge on the bottom of the electrode 7 due to the electric field lines going out of the electrode 7. This will result in measurement errors because not the whole energy of the electron avalanche is captured by the anode. Evidently, this problem is solved by the detector as shown in FIG. 1 because the bottom of the hole 9 is closed so that all electrons of the electron avalanche are detected by the anode 8. Hence, the detector cell as shown in FIG. 1 provides a more precise measurement of the energy and the intensity of the incident radiation.

In the embodiment shown in FIG. 1, the photocathode 3 is disposed directly on (i.e. in contact with) the upper electrode 5. However, also a small gap may exist between the photocathode 3 and the electrode 5 such that gas extends in the detector between all holes 9 of the gas electron multiplier 4.

Figure 2:
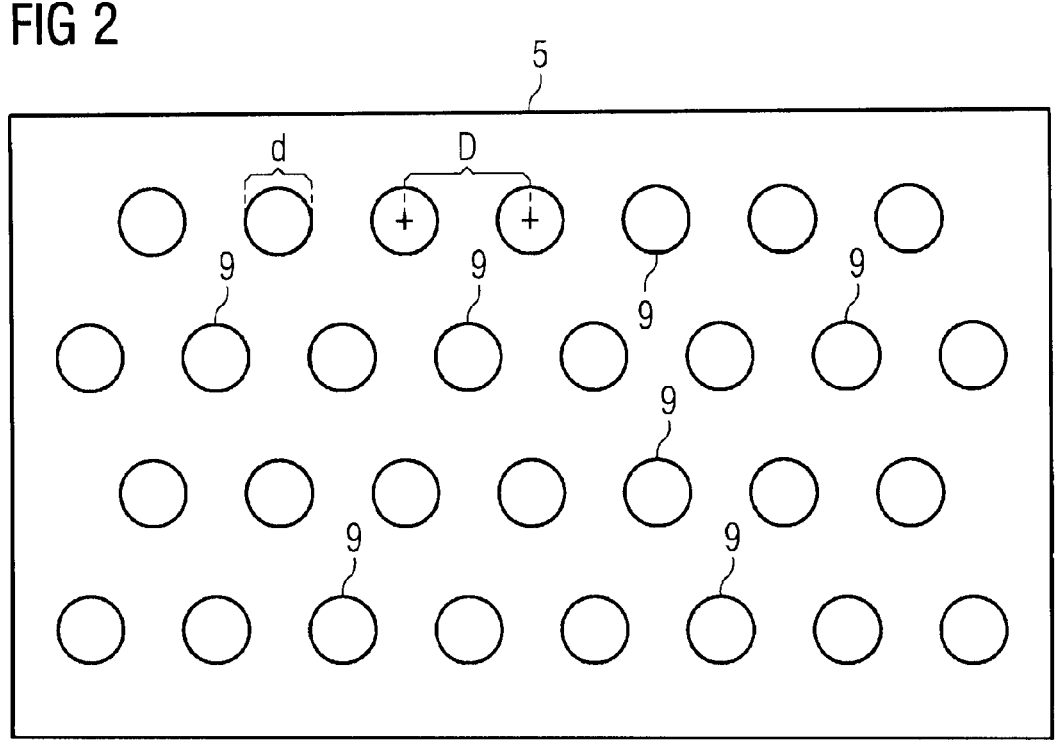
FIG. 2 shows a cross-sectional view along line II-II of FIG. 1 for an embodiment of a detector having a plurality of the cells illustrated in FIG. 1.

FIG. 2 shows a cross-sectional view along line II-II of FIG. 1 of a detector including a plurality of cells as shown in FIG. 1. As can be seen from FIG. 2, several holes 9 are formed through the upper electrode 5 in the detector. For sake of clarity, only some of the adjacent holes are designated by reference numeral 9. FIG. 2 only shows a part of the detection surface of the detector. In other words, the detector includes much more holes than shown in FIG. 2, e.g. several thousand holes. The size of the detector surface including the holes preferably lies in the range of several centimeters (e.g. 10 cm×10 cm). In order to achieve a high spatial resolution, the distance D between adjacent holes preferably lies in the range of several microns, e.g. between 10 and 100 microns. The diameter d of the holes preferably lies in the same range, i.e. between 10 and 100 microns. The spatial resolution of the detector shown in FIG. 2 is much higher than the spatial resolution which can be achieved by conventional scintillator detectors using photomultiplier tubes. Another advantage of the detector in comparison to detectors including photomultiplier tubes lies in the fact that the size of the detector is much smaller. The extension of the detector cell of FIG. 1 in the vertical direction lies in the range of several microns, whereas a photomultiplier tube has usually a length of several centimeters.

Figure 3:
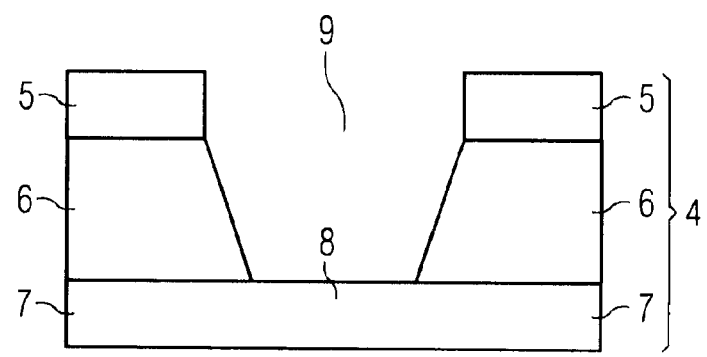
FIG. 3 shows a cross-sectional view of an embodiment of a part of a detector.
Figure 4:
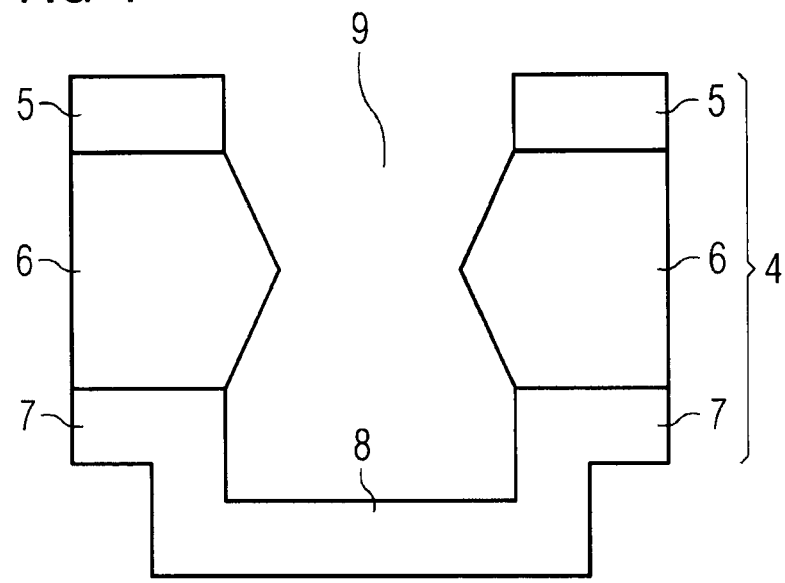
FIG. 4 shows a cross-sectional view of an embodiment of a part of a detector cell.
Figure 5:
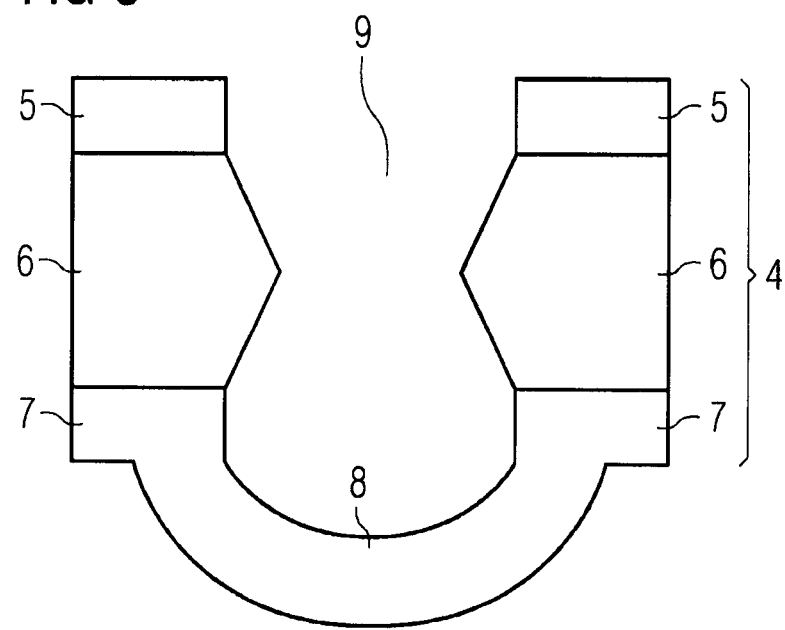
FIG. 5 shows a cross-sectional view of an embodiment of a part of a detector cell.

In the embodiment of FIG. 1, the anode 8 is formed as a flat electrode parallel to the second electrode 7. Furthermore, the hole 9 has the form of a cylinder. However, different forms of the detector anode and the hole are possible as shown in the embodiments of FIG. 3 to FIG. 5. Those figures are cross-sectional views of the part of a detector cell forming the gas electron multiplier. The part of the cell on top of this multiplier corresponds to the structure as shown in FIG. 1. In FIGS. 3 to 5, the components corresponding to FIG. 1 are designated with the same reference numerals.

FIG. 3 shows an embodiment in which the hole 9 is conically tapered from the first electrode 5 towards the second electrode 7. Furthermore, the detector anode 8 lies in the plane of the second electrode 7 such that an overall flat electrode is formed by anode 8 and electrode 7. The embodiment as shown in FIG. 3 has a very compact size.

FIG. 4 shows an embodiment where the hole 9 of the gas electron multiplier is tapered conically from both the upper electrode 5 and the lower electrode 7 towards the middle of the hole where the hole has the lowest diameter. Furthermore, the position of the detector anode 8 is offset downwards resulting in a U-shaped form of the detector anode. This embodiment enhances the detection surface of the anode 8 resulting in better detection capabilities. Furthermore, the form of the hole with tapered surfaces increases the electric field within the hole.

FIG. 5 shows another embodiment of a detector cell. As in FIG. 4, the hole 9 has tapered surfaces. Contrary to FIG. 4, the anode 8 has a half-elliptic cross-section which also results in a greater surface of the detector anode.

The embodiments as described in the foregoing have several advantages. Particularly, the measurements of the detector are more precise because there does not occur any loss of electrons in the electron avalanche generated by the gas electron multiplier. Furthermore, the size of the detector is much smaller and the spatial resolution is much higher in comparison to scintillation detectors using a photomultiplier tube.

The invention claimed is:

1. A detector for radiation, comprising:
a converting section for converting the radiation incident on the converting section in electrons by a photoelectric effect;
a gas electron multiplier for generating an electron avalanche from the electrons that are generated by the converting section and enter the gas electron multiplier, the gas electron multiplier comprising a first electrode, a dielectric layer and a second electrode, the first electrode being disposed at a first side of the dielectric layer adjacent to the converting section and the second electrode being disposed at a second side of the dielectric layer opposite to the first side, wherein the gas electron multiplier comprises a plurality of holes filled with gas, the plurality of holes extending through the first electrode, the dielectric layer and the second electrode; and
a detector anode formed integrally with the second electrode for detecting the electron avalanche, wherein the detector anode extends at each hole of the plurality of holes of the gas electron multiplier from the second electrode over the hole such that each hole of the plurality of holes is covered at one side completely by the detector anode;
wherein the converting section includes a photocathode having a first side that faces the radiation entering the converting section and an opposing second side that faces the gas electron multiplier, the photocathode directly emitting the electrons due to the photoelectric effect of light impinging on the photocathode.

2. The detector according to claim 1, wherein the converting section comprises a scintillator material disposed at the first side of the photocathode, the scintillator material converting the incident radiation into light that reaches the photocathode.

3. The detector according to claim 1, wherein the photocathode is disposed at least one of directly and with a gap filled with gas, on the first electrode.

4. The detector according to claim 1, wherein the detector anode extends at each hole of the plurality of holes in or parallel to a plane of the second electrode.

5. The detector according to claim 1, wherein the detector anode has at each hole of the plurality of holes a U-shaped cross-section along a plane perpendicular to the second electrode.

6. The detector according to claim 1, wherein the detector anode has at each hole of the plurality of holes a halfelliptic cross section along a plane perpendicular to the second electrode.

7. The detector according to claim 1, wherein each hole of the plurality of holes has a cylindrical form.

8. The detector according to claim 1, wherein each hole of the plurality of holes is tapered conically from the first electrode towards the second electrode.

9. The detector according to claim 1, wherein each hole of the plurality of holes is tapered conically from both the first electrode and the second electrode to an interior of the hole.

10. The detector according to claim 1, wherein a maximum diameter of each hole of the plurality of holes lies between 10 to 100 µm and/or the distance between the centers of adjacent holes in a plan view of the first electrode lies between 10 to 100 µm.

11. The detector according to claim 1, wherein the detector is a detector for detecting radiation in a medical device or a well-logging device.

12. The detector according to claim 1, wherein the medical device is a computer tomograph.

13. The detector according to claim 1, wherein the radiation is high energy electromagnetic radiation.

14. The detector according to claim 1, wherein the incident radiation to be detected travels in a direction perpendicular to the photocathode.

* * * * *

UNITED STATES PATENT AND TRADEMARK OFFICE
CERTIFICATE OF CORRECTION

PATENT NO. : 9,594,171 B2
APPLICATION NO. : 14/403707
DATED : March 14, 2017
INVENTOR(S) : Irina Astafieva et al.

Page 1 of 1

It is certified that error appears in the above-identified patent and that said Letters Patent is hereby corrected as shown below:

On the Title Page

Other Publications, Column 2, Line 1, please change "Office Office Action" to --Office Action--

In the Claims

Column 6, Lines 37, 38 (Claim 6, Lines 2 and 3), please change "halfelliptic cross section" to --half elliptic cross-section--

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*